US012565809B2

(12) United States Patent
Qiu

(10) Patent No.: US 12,565,809 B2
(45) Date of Patent: Mar. 3, 2026

(54) DAY-AND-NIGHT CURTAIN DUAL-RAIL DUAL-CONTROL CORRELATION TYPE STOPPER

(71) Applicant: Guangzhou JADY Window Coverings Technology Co., Ltd., Guangzhou (CN)

(72) Inventor: Yongzhong Qiu, Guangzhou (CN)

(73) Assignee: Guangzhou JADY Window Coverings Technology Co., Ltd, Guangzhou (CN)

(*) Notice: Subject to any disclaimer, the term of this patent is extended or adjusted under 35 U.S.C. 154(b) by 295 days.

(21) Appl. No.: 18/473,953

(22) Filed: Sep. 25, 2023

(65) Prior Publication Data

US 2024/0052699 A1 Feb. 15, 2024

Related U.S. Application Data

(63) Continuation of application No. PCT/CN2023/093519, filed on May 11, 2023.

(30) Foreign Application Priority Data

Aug. 4, 2022 (CN) ........................ 202222046407.0

(51) Int. Cl.
*E06B 9/68* (2006.01)
*E06B 9/262* (2006.01)
*E06B 9/40* (2006.01)

(52) U.S. Cl.
CPC ................ *E06B 9/68* (2013.01); *E06B 9/262* (2013.01); *E06B 9/40* (2013.01); *E06B 2009/2625* (2013.01); *E06B 2009/405* (2013.01)

(58) Field of Classification Search
CPC ..... E06B 9/17; E06B 9/68; E06B 9/40; E06B 2009/405; E06B 9/42; E06B 9/262;
(Continued)

(56) References Cited

U.S. PATENT DOCUMENTS 1,896,623 A * 2/1933 Hixon ........................ E06B 9/70 160/310
6,158,494 A * 12/2000 Huang .................... E06B 9/262 160/171
(Continued)

FOREIGN PATENT DOCUMENTS

| | | |
|---|---|---|
| CN | 207212061 U | 4/2018 |
| CN | 107989493 A | 5/2018 |
| CN | 211314037 U | 8/2020 |

*Primary Examiner* — Daniel P Cahn
*Assistant Examiner* — Matthew R. Shepherd
(74) *Attorney, Agent, or Firm* — Cooper Legal Group, LLC

(57) ABSTRACT

Provided is a day-and-night curtain dual-rail dual-control correlation type stopper, comprising a limiting seat, a down-running stop block, an up-running stop block, a main screw rod, a main gear, an auxiliary screw rod and an auxiliary gear, wherein the main gear meshes with the auxiliary gear, the main screw rod is provided with a down-running stop boss, the auxiliary screw rod is provided with an up-running stop boss and a synchronous linkage boss, an end face of the auxiliary gear is provided with a synchronous linkage shifting block, and the synchronous linkage shifting block shifts the synchronous linkage boss so that an auxiliary mandrel follows a main mandrel to rotate synchronously.

10 Claims, 10 Drawing Sheets

(58) Field of Classification Search
CPC ............... E06B 2009/2625; E06B 9/08; E06B 2009/2423; E06B 9/32; E06B 2009/2441
See application file for complete search history.

(56) References Cited

U.S. PATENT DOCUMENTS

| | | | | |
|---|---|---|---|---|
| 7,520,311 | B2 * | 4/2009 | Drew | E06B 9/64 160/171 |
| 7,857,033 | B2 * | 12/2010 | Malausa | E06B 9/88 160/310 |
| 8,365,797 | B2 * | 2/2013 | Drew | E06B 9/262 160/84.05 |
| 8,640,562 | B2 * | 2/2014 | Pettersson | F16H 25/2015 74/89.37 |
| 9,988,838 | B2 * | 6/2018 | Chen | E06B 9/323 |
| 10,655,388 | B2 * | 5/2020 | Smith | E06B 9/322 |
| 10,871,029 | B2 * | 12/2020 | Ter Haar | E06B 9/325 |
| 11,339,607 | B2 * | 5/2022 | Cheng | E06B 9/322 |
| 11,384,599 | B2 * | 7/2022 | Tao | A47H 5/03 |
| 11,448,009 | B2 * | 9/2022 | Otsuka | E06B 9/262 |
| 11,486,193 | B2 * | 11/2022 | Chiang Huang | E06B 9/322 |
| 2003/0168186 | A1 * | 9/2003 | Wen | E06B 9/322 160/168.1 P |
| 2003/0168189 | A1 * | 9/2003 | Chung | E06B 9/32 160/171 |
| 2003/0226644 | A1 * | 12/2003 | Koot | E06B 9/32 160/84.02 |
| 2004/0194897 | A1 * | 10/2004 | Wen | E06B 9/322 160/168.1 P |
| 2005/0072635 | A1 * | 4/2005 | Toti | E06B 9/262 74/354 |
| 2006/0037720 | A1 * | 2/2006 | Huang | E06B 9/32 160/171 |
| 2006/0225849 | A1 * | 10/2006 | Krab | E06B 9/384 160/236 |
| 2008/0216967 | A1 * | 9/2008 | Liang | E06B 9/326 160/168.1 V |
| 2010/0155000 | A1 * | 6/2010 | Krab | E06B 9/32 160/171 |
| 2011/0265962 | A1 * | 11/2011 | Drew | E06B 9/262 160/340 |
| 2011/0265963 | A1 * | 11/2011 | Drew | E06B 9/262 160/340 |
| 2012/0267060 | A1 * | 10/2012 | Anderson | E06B 9/262 160/307 |
| 2014/0166216 | A1 * | 6/2014 | Hsu | E06B 9/262 160/84.03 |
| 2015/0059992 | A1 * | 3/2015 | Liu | E06B 9/80 160/313 |
| 2016/0222725 | A1 * | 8/2016 | Morris | E06B 9/262 |
| 2018/0216404 | A1 * | 8/2018 | Fisher | E06B 9/90 |

* cited by examiner

DAY-AND-NIGHT CURTAIN DUAL-RAIL DUAL-CONTROL CORRELATION TYPE STOPPER

CROSS-REFERENCE TO RELATED APPLICATIONS

The application claims priority to Chinese patent application No. 202222046407.0, filed on Aug. 4, 2022, the entire contents of which are incorporated herein by reference.

TECHNICAL FIELD

The present disclosure relates to the technical field of curtains, and particularly relates to a day-and-night curtain stopper.

BACKGROUND

The existing organ curtains, pleated curtains, blind curtains and day-and-night curtains all have stacked curtains, wherein the curtains are parts of curtains for lifting and shielding sunlight. Organ curtains, pleated curtains, blind curtains and day-and-night curtains all rise or fall at the bottom of the curtain to adjust the shade position, but the top of the curtain of this structure is always shade, and therefore the top of the curtain cannot rise or fall down which cannot meet the user's needs, and the control mode is single.

In order to solve the above-mentioned problems, the China National Intellectual Property Administration disclosed a patent document with the publication number CN213450157 U on Jun. 15, 2021, and disclosed a dual-rail dual-control curtain, including a first guide rail, a second guide rail, a first control mechanism, a second control mechanism and a curtain main body, wherein the first control mechanism is arranged on the first guide rail, the second control mechanism is arranged on the second guide rail, and the first guide rail and the second guide rail are arranged above and below, the first control mechanism being provided with a first rope reel and a plurality of first winders which move synchronously, one end of the first rope reel being connected to the first rope winder, and the other end being connected to an upper end or a lower end of the curtain main body after passing through the second guide rail so as to control the upper end or the lower end of the curtain main body to move up and down, a second rope reel and a second rope winder being provided on the second guide rail, one end of the second rope reel being connected to the second rope winder, and the other end being connected to the lower end or the upper end of the curtain main body so as to control the lower end or the upper end of the curtain main body to move up and down, the upper guide rail and lower guide rail being formed and the first control mechanism connected to an upper end of the curtain main body and a second control mechanism connected to a lower end of the curtain main body being respectively provided on the upper guide rail and lower guide rail to control the upper end and lower end of the curtain main body simultaneously, so that the curtain can be suspended at different heights. A first shaft core is provided on a left-hand head, the first shaft core is connected in series to a first stopper and a plurality of first rope reels, and the first shaft core drives the first stopper and the first rope reels to move so as to form a transmission control of a first control mechanism. A second shaft core is provided on a right-hand head, the second shaft core is connected in series to a second stopper and a plurality of second rope reels, and the second shaft core drives the second stopper and the second rope reels to move so as to form a transmission control of a second control mechanism.

It can be seen that the above-mentioned patent document uses a dual-rail dual-control mode of two stoppers, and use two stoppers which are independent from each other. During the operation, the two stoppers cannot play the role of mutually limiting the stroke. When the bottom rail of the curtain moves up to support the top rail of the curtain so that the lifting rope of the lifting winder of the top rail of the curtain body loses the gravity of the top rail of the curtain body, if the bottom rail of the curtain continues to move up at this time, the lifting rope of the lifting winder of the top rail will be loosened, which would easily cause the rope arrangement of the lifting winder of the top rail of the day-and-night curtain to be disordered, thus causing the day-and-night curtain to have a fault and affecting the normal use of the day-and-night curtain.

Therefore, in order to solve the problem that the lifting rope of the lifting winder of the top rail is loose and the rope arrangement is disordered, it is an urgent problem to study a stopper which can correlatively and synchronously control the movement of double rails for the day-and-night curtains.

SUMMARY

The purpose of the present disclosure is to provide a day-and-night curtain dual-rail dual-control correlation type stopper, wherein the stopper can realize dual-rail linkage so as to solve the problems of the lifting rope of the lifting winder of the top rail being loose and disordered rope arrangement.

The technical solution adopted by the present disclosure to solve the technical problem thereof is described in the following content:

A day-and-night curtain dual-rail dual-control correlation type stopper, including a limiting seat, a down-running stop block, an up-running stop block, a main screw rod, a main gear, an auxiliary screw rod and an auxiliary gear, a side wall of the limiting seat being provided with a main threaded through-hole and an auxiliary threaded through-hole, one end of the main screw rod being inserted in the main threaded through-hole and being in threaded connection with the main threaded through-hole, the main gear being fixedly mounted on the main screw rod, the main screw rod being innerly provided with a main through-hole, the main through-hole being inserted on a main mandrel for driving a lifting winder of a curtain bottom rail and the main screw rod being able to slide along the main mandrel, the main gear meshing with the auxiliary gear, the auxiliary gear being provided with a threaded through-hole, the auxiliary gear being inserted on the auxiliary screw rod via a threaded through-hole and being in a threaded connection with the auxiliary screw rod, one end of the auxiliary screw rod being inserted in the auxiliary threaded through-hole and being in a threaded connection with the auxiliary threaded through-hole, the auxiliary screw rod being innerly provided with an auxiliary through-hole, the auxiliary through-hole being inserted on an auxiliary mandrel for driving a lifting winder of a curtain top rail and the auxiliary screw rod being able to slide along the auxiliary mandrel, a down-running stop boss being provided on the main screw rod, when the main mandrel drives the curtain bottom rail to move downwards, the main screw rod being driven to rotate simultaneously, the limiting seat being fixed and enabling the main screw rod threadedly connected thereto to slide along the main mandrel, the main screw rod driving the main gear to rotate and move simultaneously, the main gear driving the auxiliary gear to rotate, the auxiliary gear moving synchronously with the main gear along the auxiliary screw rod, the down-running stop boss moving along with the main screw rod, and when the curtain bottom rail moves downwards to a lowest position, the down-running stop block blocking the down-running stop boss so as to prevent the main screw rod and the main mandrel from continuing to rotate, a second end of the auxiliary screw rod being provided with an up-running stop boss and a synchronous linkage boss, an end face of the auxiliary gear being provided with a synchronous linkage shifting block, when the main mandrel drives the curtain bottom rail to move upwards, the main screw rod being driven to rotate in a reverse direction simultaneously, the limiting seat enabling the main screw rod threadedly connected thereto to slide in a reverse direction along the main mandrel, the main screw rod driving the main gear to rotate in a reverse direction and move in a reverse direction simultaneously, the main gear driving the auxiliary gear to rotate in a reverse direction, the auxiliary gear moving with the main gear in a reverse direction synchronously along the auxiliary screw rod, when a lifting rope of the lifting winder of the curtain top rail loses a weight of the curtain top rail, the synchronous linkage shifting block contacting the synchronous linkage boss and shifting the synchronous linkage boss so as to drive the auxiliary screw rod to follow the auxiliary gear in synchronous rotation, the auxiliary screw rod driving the auxiliary mandrel so that the auxiliary mandrel follows the main mandrel in synchronous rotation, the limiting seat enabling the auxiliary screw rod threadedly connected thereto to slide along the auxiliary mandrel, the up-running stop boss moving along with the auxiliary screw rod, and when the curtain top rail running up to a topmost position, the up-running stop block blocking the up-running stop boss so as to prevent the auxiliary mandrel and the main mandrel from continuing to rotate.

Further, the down-running stop block is provided on a side wall of the limiting seat.

The day-and-night curtain dual-rail dual-control correlation type stopper further includes an encapsulation box, an insertion hole being provided on one end face of the encapsulation box, a main mandrel passing-through port and an auxiliary mandrel passing-through port being provided on a second end face of the encapsulation box, a insertion connector being provided on the limiting seat, the limiting seat being provided in the encapsulation box and enabling the insertion connector to be inserted at the insertion hole, and the main gear, the auxiliary gear and the up-running stop block being provided in the encapsulation box.

Further, the encapsulation box includes an upper box body and a lower box body, the upper box body is provided with two hooks at a bottom of two sides of the upper box body, with each side of the two sides having one hook, a groove is provided at a top of the two sides of the lower box body, the two hooks are snap-fitted in the corresponding groove such that the upper box body and the lower box body are snap-fitted together, and the up-running stop block is provided on a bottom surface of the lower box body and close to one end, where the main mandrel passing-through port and the auxiliary mandrel passing-through port are provided, of the encapsulation box.

Further, a main rotary sliding sleeve is provided at the main mandrel passing-through port, and the main mandrel passes through a non-circular through-hole of the main rotary sliding sleeve; the auxiliary mandrel passing-through port is provided with an auxiliary rotary sliding sleeve, and the auxiliary mandrel passes through a non-circular through-hole of the auxiliary rotary sliding sleeve.

Further, a guide positioning plate is provided at the bottom of the two sides of the upper box body and located between the two hooks, a guide positioning groove is provided at the top of the two sides of the lower box body and located between two grooves, and the guide positioning plate is located in the guide positioning groove so as to align the two hooks with the grooves.

Further, a bottom surface of the limiting seat is provided with two insertion blocks and plug-in holes, the plug-in holes are located between the two insertion blocks, the bottom surface of the lower box body is provided with two plug-in grooves and insertion posts, the two insertion blocks are plugged in the plug-in grooves, and the insertion posts are plugged in the plug-in holes, so as to fix the limiting seat on the bottom surface of the limiting seat.

Further, a second end of the main screw rod is a D-shaped shaft, a protrusion is provided on the D-shaped shaft near an external thread of the main screw rod, the down-running stop boss is provided on a side wall of the protrusion, a fixing sleeve is provided on one end of the main gear, the main gear is integrally formed with the fixing sleeve, a through-hole of the fixing sleeve is a D-shaped hole adapted to the D-shaped shaft, and the fixing sleeve is inserted on the D-shaped shaft.

Further, the fixing sleeve is provided with a fixing hole, and a screw passes through the fixing hole and is in threaded connection with the D-shaped shaft to fix the main gear.

Further, a debugging observation window is provided on a surface of the upper box body.

Advantageous effects of the present disclosure are as follows:

The stopper of the present disclosure adopts the above-mentioned technical solution, and achieves the dual-rail dual-control correlation type limit control. When a lifting rope of a curtain top rail lifting winder loses the gravity of the curtain top rail, double rails can achieve synchronous linkage through the stopper, thereby completely solving the problem of the lifting rope of the top rail lifting winder being slack and the rope arrangement being confused, and making the operation of the day-and-night curtain more safe and reliable.

Since the two rails share a stopper, the components of the day-and-night curtain are simplified and the cost is reduced; and the stopper in the present disclosure has only one housing, two screw rods and two gears, and has the features of simple and compact structure, convenient installation, long service life and safe and reliable operation.

The stopper of the present disclosure also has the function of limiting a up-running stroke and a down-running stroke of the curtain main body, which greatly improves the operation safety.

The use of the stopper enables the dual-rail dual-control day-and-night curtain to retain the original function, and can also realize the control of the upper end and the lower end of the curtain main body, so that the curtain can hover at different heights, and not only can be adjusted to shield at any height below or at the hovering position, but also can be adjusted with a size of a blocking area above the upper end of the curtain main body. According to different lighting positions, the position and height of the curtain can be adjusted to form an up-down double-side-opening or single-side-opening curtain, which is more flexible in control and more convenient in operation compared with the existing bottom-opening lifting curtain.

BRIEF DESCRIPTION OF DRAWINGS

The present disclosure is further illustrated by means of the accompanying drawings, but the embodiments in the drawings do not constitute any limitation of the present disclosure, and a person skilled in the art would have been able to obtain other drawings according to the following drawings without involving any inventive effort.

Figure 1:
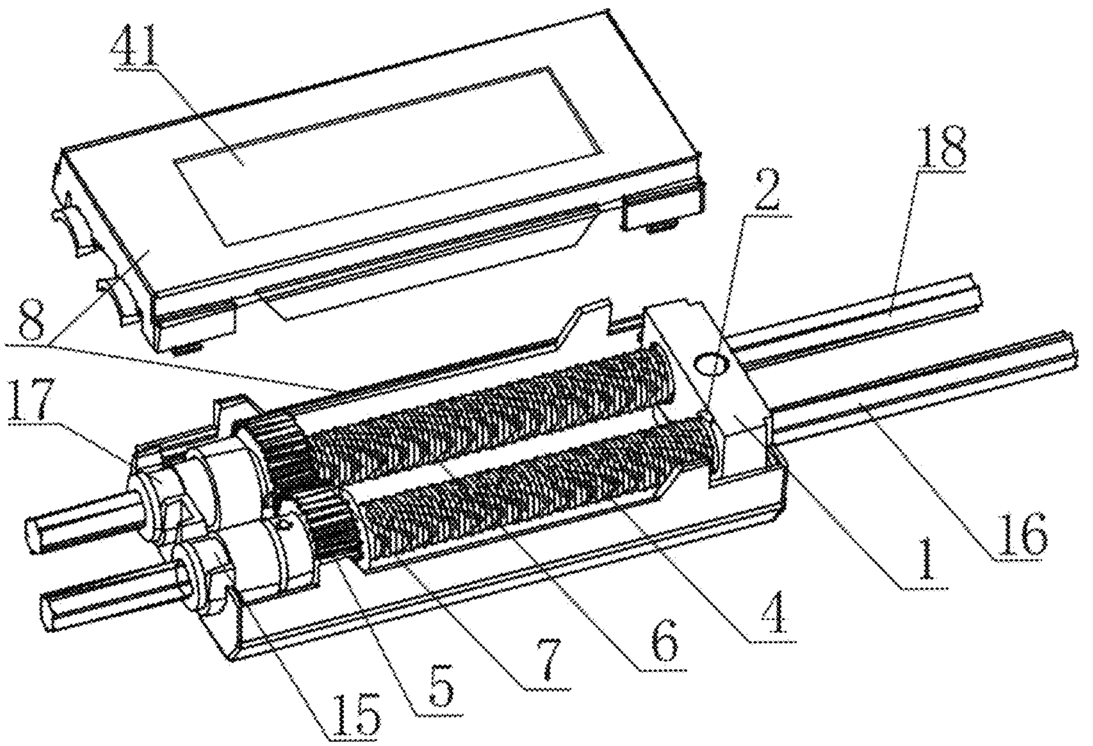
FIG. 1 is a schematic structural view of the present disclosure.

In the drawings: 1, limiting seat; 2, down-running stop block; 3, up-running stop block; 4, main screw rod; 5, main gear; 6, auxiliary screw rod; 7, auxiliary gear; 8, encapsulation box; 9, upper box body; 10, lower box body; 11, hook; 12, groove; 13, main mandrel passing-through port; 14, auxiliary mandrel passing-through port; 15, main rotary sliding sleeve; 16, main mandrel; 17, auxiliary rotary sliding sleeve; 18, auxiliary mandrel; 19, insertion hole; 20, insertion connector; 21, main threaded through-hole; 22, auxiliary threaded through-hole; 23, main through-hole; 24, threaded through-hole; 25, auxiliary through-hole; 26, down-running stop boss; 27, D-shaped shaft; 28, protrusion; 29, fixing sleeve; 30, D-shaped hole; 31, up-running stop boss; 32, synchronous linkage boss; 33, synchronous linkage shifting block; 34, guide positioning plate; 35, guide positioning groove; 36, insertion block; 37, plug-in hole; 38, plug-in groove; 39, insertion post; 40, a gravity clutch; 41, debugging observation window.

DETAILED DESCRIPTION OF THE EMBODIMENTS

In order that a person skilled in the art may better understand the technical aspects of the present disclosure, the following detailed description of the disclosure is made with reference to the accompanying drawings and specific examples. It should be noted that the embodiments and technical features in the embodiments in the present disclosure can be combined with each other without conflict.

In the description of the present disclosure, it should be noted that the orientation or positional relationship indicated by the terms "upper", "lower", "front", "rear", "left", "right", "vertical", "horizontal", "top", "bottom", "inner", "outer", etc. is based on the orientation or positional relationship shown in the drawings, merely to facilitate the description of the present disclosure and simplify the description, and does not indicate or imply that the devices or elements referred to must have a particular orientation, be constructed and operated in a particular orientation, and thus should not be construed as limiting the present disclosure.

Figure 2:
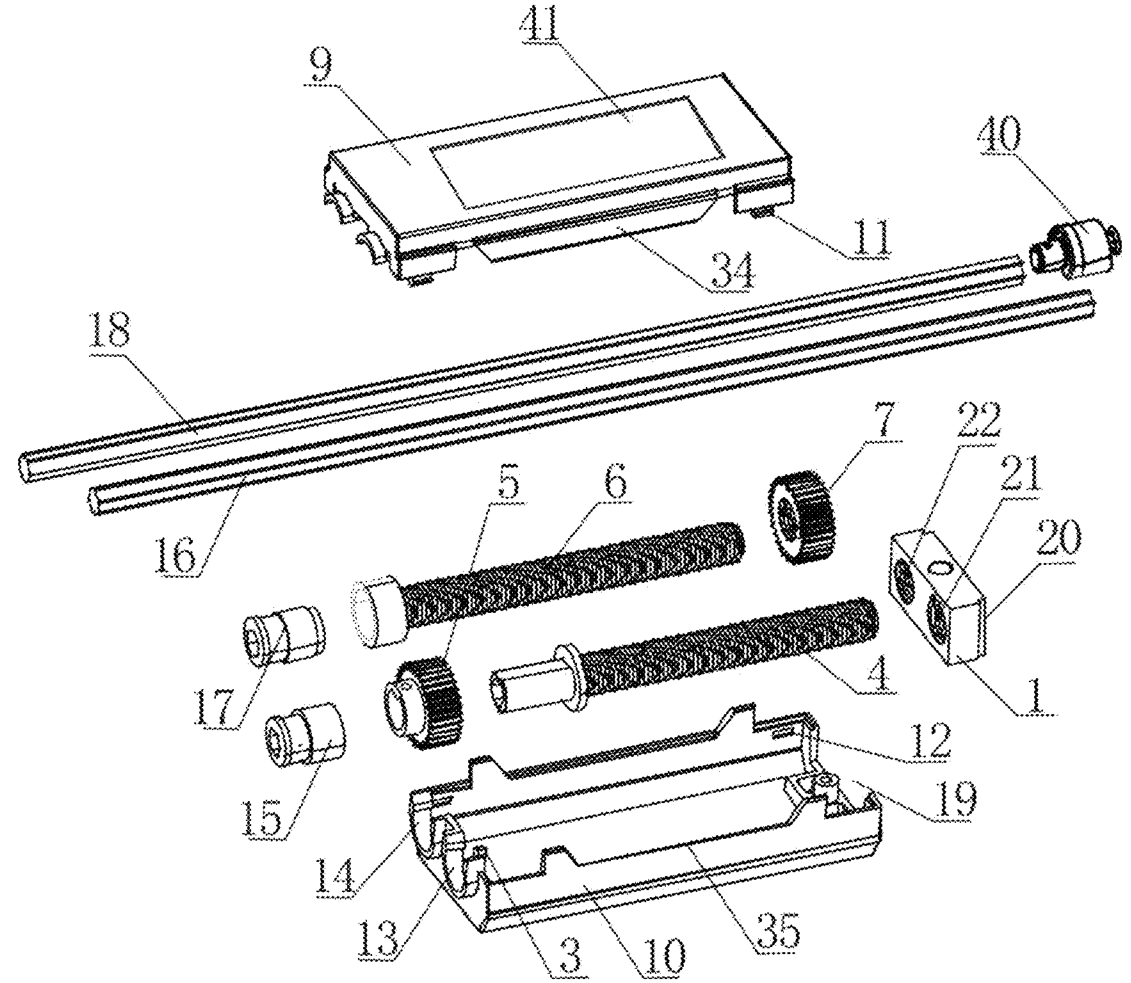
FIG. 2 is an exploded view of FIG. 1.
Figure 3:
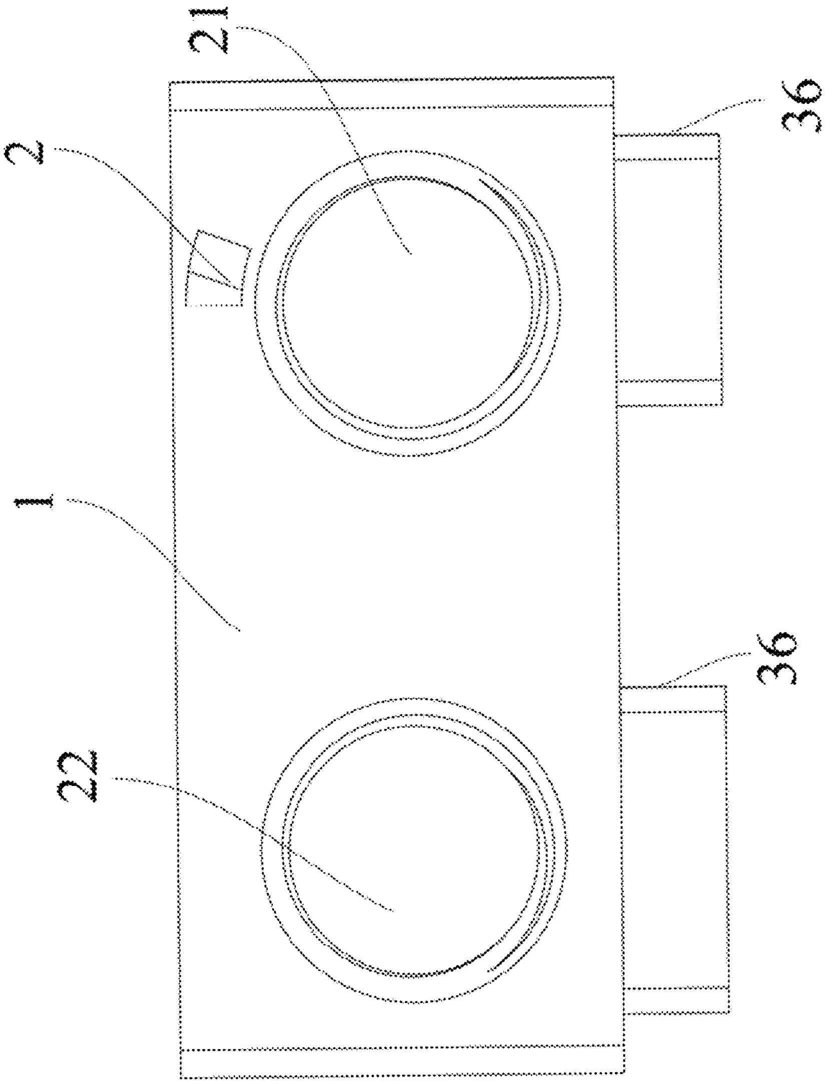
FIG. 3 is a schematic structural view of a limiting seat shown in FIG. 1.
Figure 4:
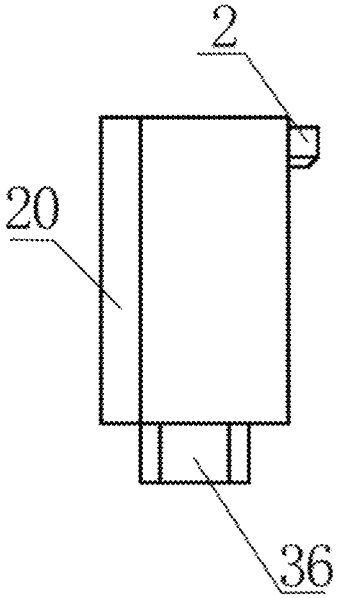
FIG. 4 is a side view of FIG. 3.
Figure 5:
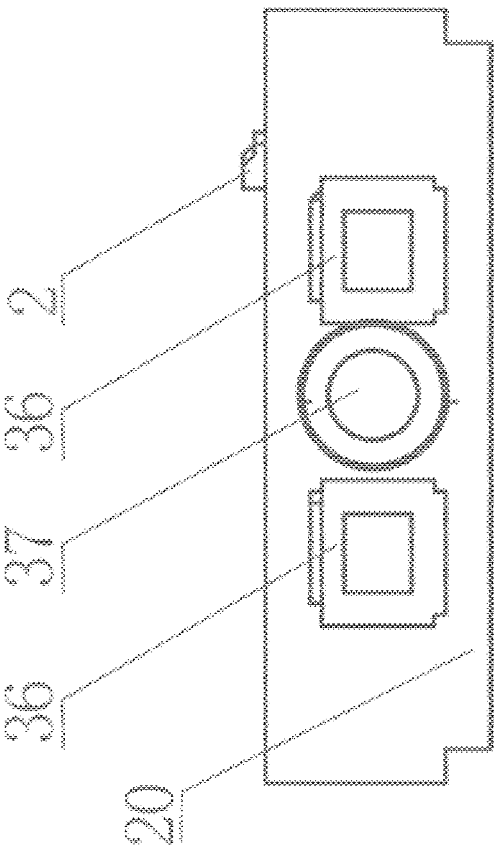
FIG. 5 is a bottom view of FIG. 3.
Figure 6:
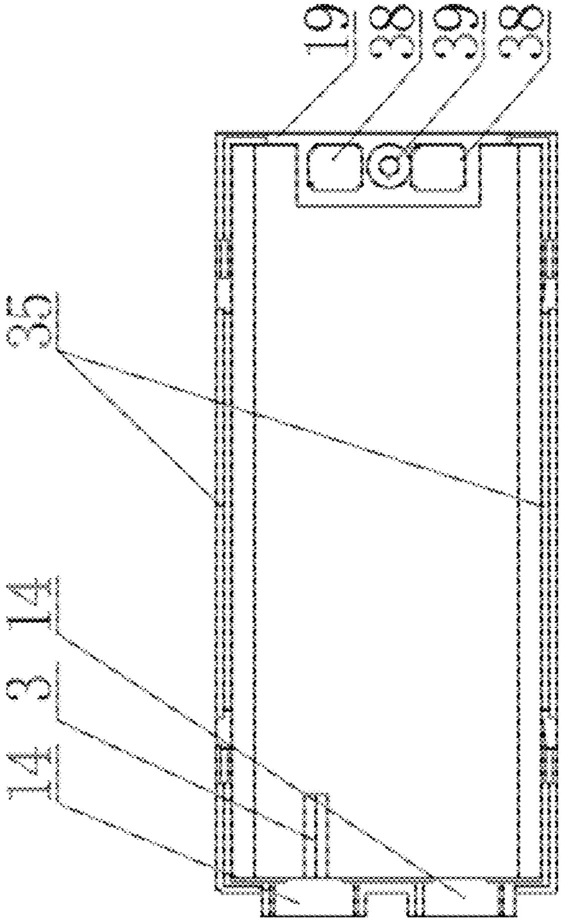
FIG. 6 is a schematic structural view of a lower box body shown in FIG. 2.
Figure 7:
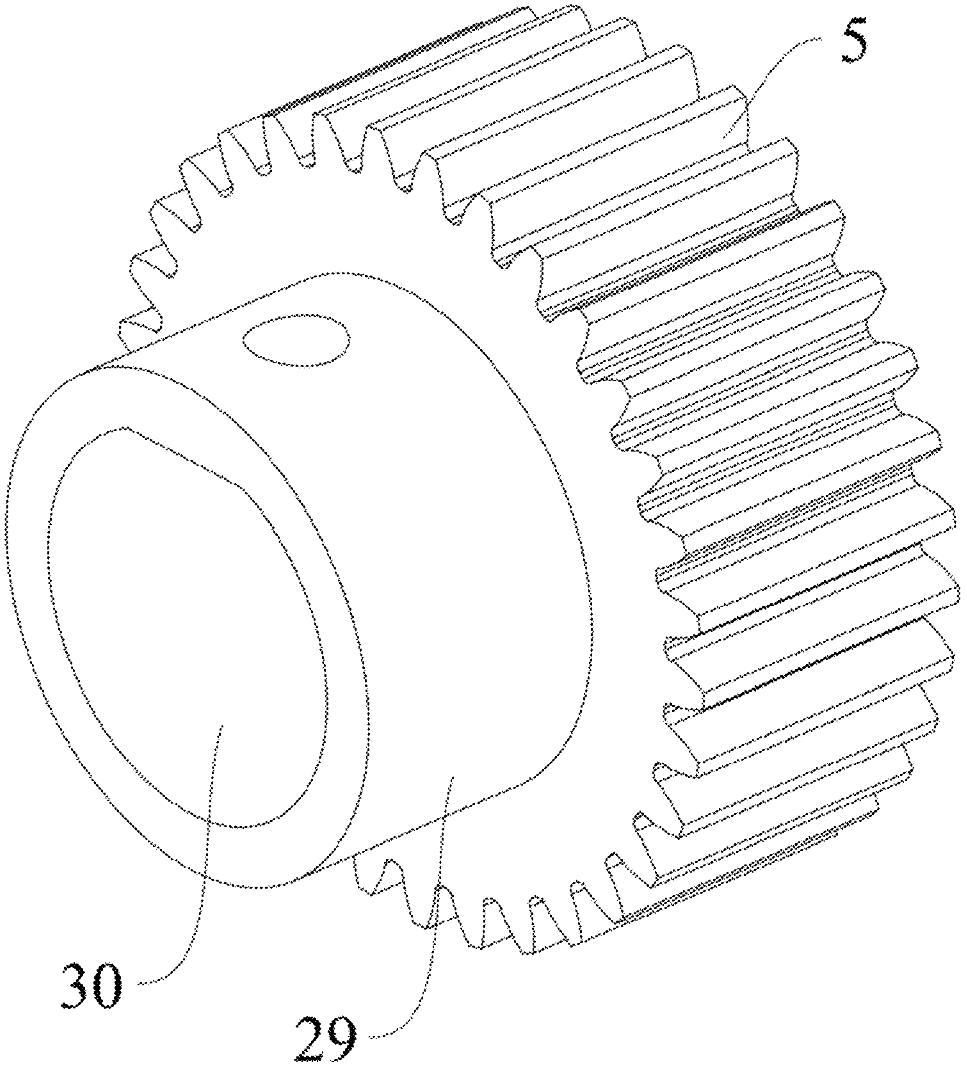
FIG. 7 is a schematic structural view of a main gear shown in FIG. 2.
Figure 8:
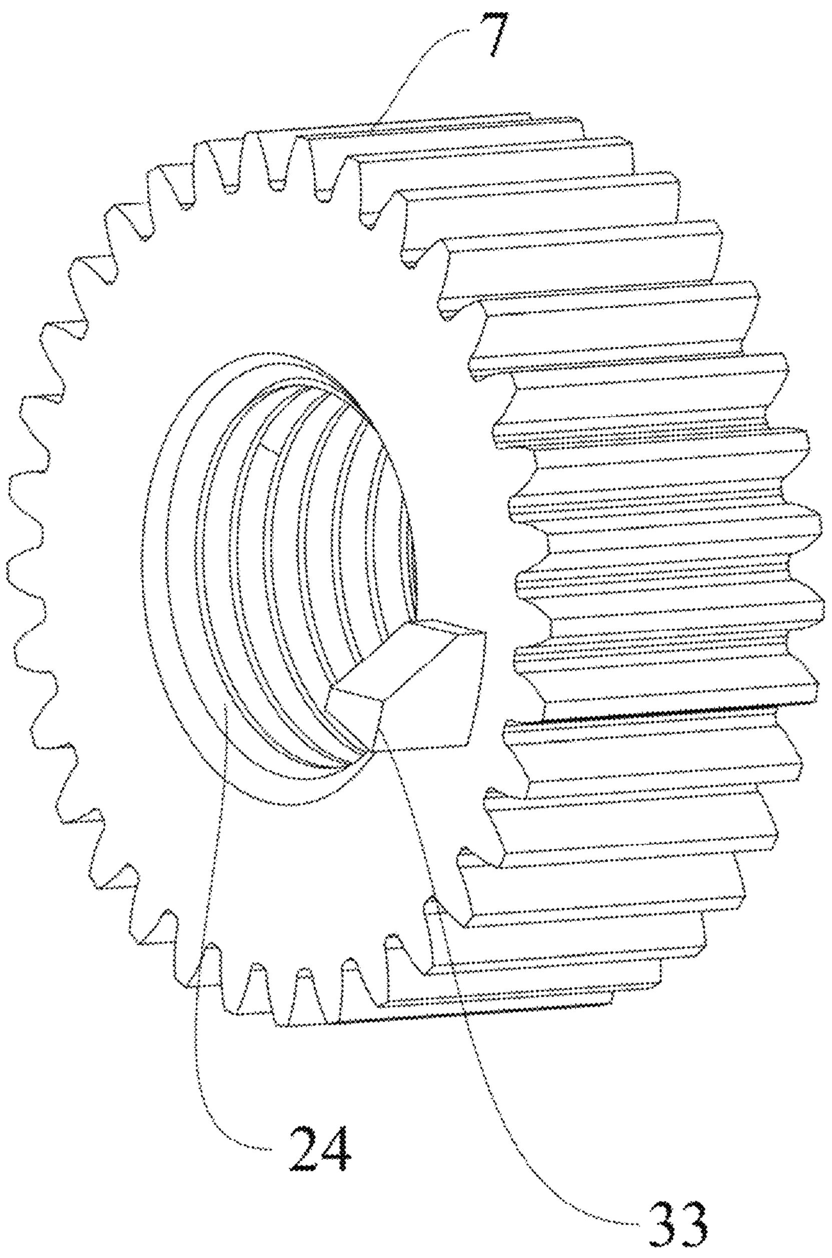
FIG. 8 is a schematic structural view of an auxiliary gear shown in FIG. 2.
Figure 9:
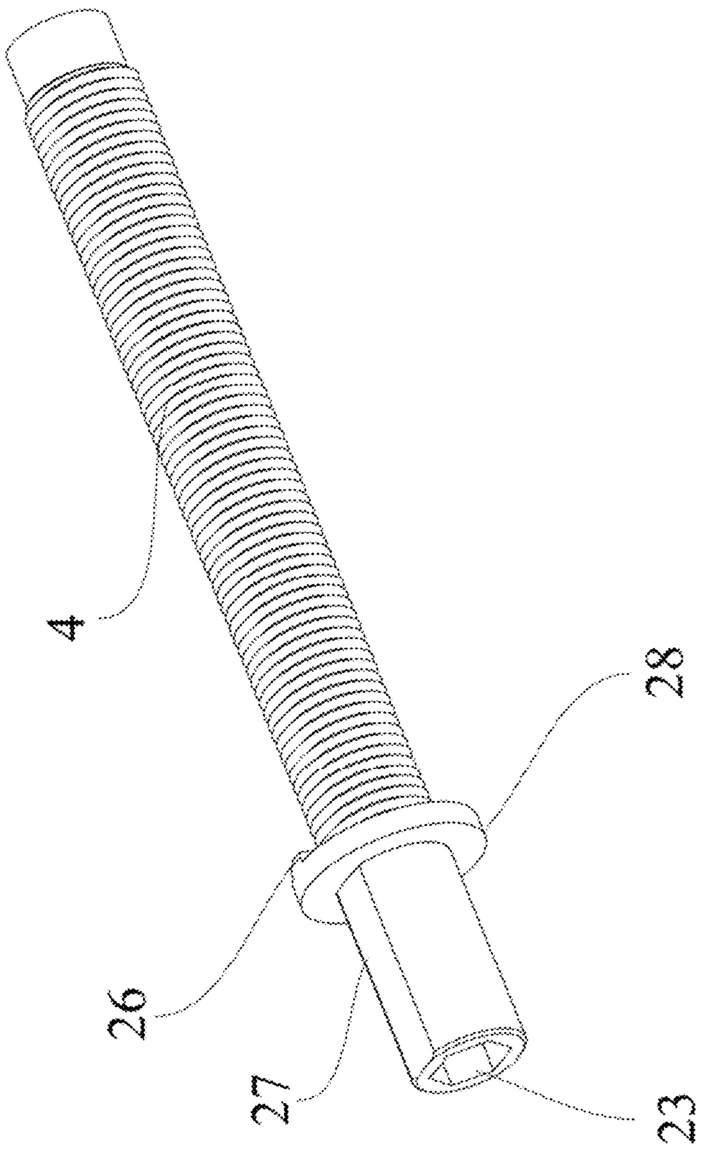
FIG. 9 is a schematic structural view of a main screw rod shown in FIG. 2.
Figure 10:
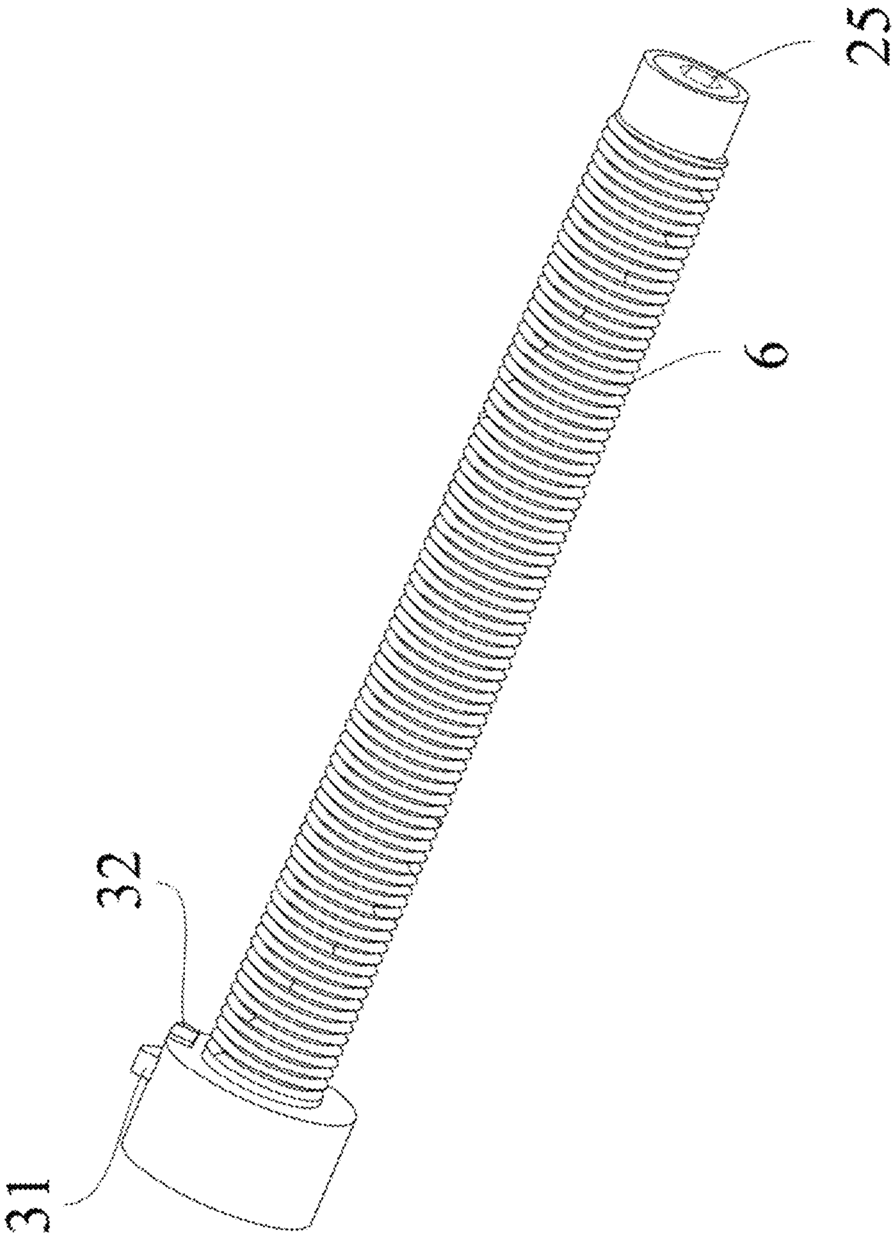
FIG. 10 is a schematic structural view of an auxiliary screw rod shown in FIG. 2.

As shown in FIGS. 1 and 2, a day-and-night curtain dual-rail dual-control correlation type stopper includes a limiting seat 1, a down-running stop block 2, an up-running stop block 3, a main screw rod 4, a main gear 5, an auxiliary screw rod 6, an auxiliary gear 7 and an encapsulation box 8, wherein the down-running stop block 2 is provided on a side wall of the limiting seat 1, and the main gear 5, the auxiliary gear 7 and the up-running stop block 3 are provided in the encapsulation box 8.

The encapsulation box 8 includes an upper box body 9 and a lower box body 10, a hook 11 is provided at bottom of two sides of the upper box body 9, a groove 12 is provided at top of two sides of the lower box body 10, the hook 11 is snap-fitted in the corresponding groove 12 such that the upper box body 9 and the lower box body 10 are snap-fitted together.

An insertion hole 19 is provided on one end face of the encapsulation box 8, and a main mandrel passing-through port 13 and an auxiliary mandrel passing-through port 14 are provided on the other end face of the encapsulation box 8. The up-running stop block 3 is provided on a bottom surface of the lower box body 10 and close to one end, where the main mandrel passing-through port 13 and the auxiliary mandrel passing-through port 14 are provided, of the encapsulation box. A main rotary sliding sleeve 15 is provided at the main mandrel passing-through port 13, and the main mandrel 16 passes through a non-circular through-hole of the main rotary sliding sleeve 15. The main rotary sliding sleeve 15 rotates together with the main mandrel 16. The auxiliary mandrel passing-through port 14 is provided with an auxiliary rotary sliding sleeve 17, the auxiliary mandrel 18 passes through a non-circular through-hole of the auxiliary rotary sliding sleeve 17, and the auxiliary rotary sliding sleeve 17 rotates together with the auxiliary mandrel 18.

As shown in FIG. 2, the limiting seat 1 is provided with an insertion connector 20, and the limiting seat 1 is provided in the encapsulation box 8 and enables the insertion connector 20 to be plugged at the insertion hole 19.

As shown in FIGS. 3, 4, 5 and 6, the side wall of the limiting seat 1 is provided with a main threaded through-hole 21 and an auxiliary threaded through-hole 22. A bottom surface of the limiting seat 1 is provided with two insertion blocks 36 and plug-in holes 37, the plug-in holes 37 are located between the two insertion blocks 36, the bottom surface of the lower box body 10 is provided with two plug-in grooves 38 and insertion posts 39, the two insertion blocks 36 are plugged in the plug-in grooves 37, and the insertion posts 39 are plugged in the plug-in holes 37, so as to fix the limiting seat 1.

One end of the main screw rod 4 is inserted into a main threaded through-hole 21 and is in threaded connection with the main threaded through-hole 21. The main gear 5 is fixedly mounted on the main screw rod 4. A main through-hole 23 is provided in the main screw rod 4. The main through-hole 23 is inserted on a main mandrel 16 for driving a lifting winder of a curtain bottom rail and the main screw rod 4 can slide along the main mandrel 16. The main gear 5 meshes with the auxiliary gear 7. A threaded through-hole 24 is provided on the auxiliary gear 7. The auxiliary gear 7 is inserted on the auxiliary screw rod 6 through the threaded through-hole 24 and is in threaded connection with the auxiliary screw rod 6. One end of the auxiliary screw rod 6 is inserted into the auxiliary threaded through-hole 22 and is in threaded connection with the auxiliary threaded through-hole 22. An auxiliary through-hole 25 is provided in the auxiliary screw rod 6, the auxiliary through-hole 25 is inserted on the auxiliary mandrel 18 for driving a lifting winder of a curtain head rail and the auxiliary screw rod 6 can slide along the auxiliary mandrel 18.

The auxiliary mandrel 18 and the main mandrel 16 have a non-circular structure in cross section, and the auxiliary through-hole 25 and the main through-hole 23 are also of a non-circular structure, so that the main screw rod 4 and the auxiliary screw rod 6 respectively rotate together with the main mandrel 16 and the auxiliary mandrel 18 to prevent relative sliding.

As shown in FIGS. 7, 8, 9 and 10, the main screw rod 4 is provided with a down-running stop boss 26. Specifically, the other end of the main screw rod 4 is a D-shaped shaft 27, a protrusion 28 is provided on the D-shaped shaft 27 near an external thread of the main screw rod 4, and the down-running stop boss 26 is provided on a side wall of the protrusion 28. A fixing sleeve 29 is provided on one end of the main gear 5, the main gear 5 is integrally formed with the fixing sleeve 29, the through-hole of the fixing sleeve 29 is a D-shaped hole 30, and the fixing sleeve 29 is inserted on the D-shaped shaft 27 and fixed by a screw.

When the main mandrel 16 drives the curtain bottom rail to move downwards, the main screw rod 4 is driven to rotate simultaneously. The fixed and immovable stop seat 1 makes the main screw rod 4 threadedly connected thereto slide along the main mandrel 16. The main screw rod 4 drives the main gear 5 to rotate and move simultaneously. The main gear 5 drives the auxiliary gear 7 to rotate, and the auxiliary gear 7 moves synchronously with the main gear 5 along the auxiliary screw rod 6. The down-running stop boss 26 moves together with the main screw rod 4. When the curtain bottom rail moves downwards to a lowermost position, the down-running stop block 2 stops the down-running stop boss 26 so as to prevent the main screw rod 4 and the main mandrel 16 from continuing to rotate. The other end of the auxiliary screw rod 6 is provided with an up-running stop boss 31 and a synchronous linkage boss 32. An end face of the auxiliary gear 7 is provided with a synchronous linkage shifting block 33. When the main mandrel 16 drives the curtain bottom rail to move upwards, the main screw rod 4 is driven to rotate in a reverse direction simultaneously. The fixed and immovable limiting seat 1 enables the main screw rod 4 threadedly connected thereto to slide in a reverse direction along the main mandrel 16. The main screw rod 4 drives the main gear 5 to rotate in a reverse direction and move in a reverse direction simultaneously. The main gear 5 drives the auxiliary gear 7 to rotate in a reverse direction, and the auxiliary gear 7 moves in a synchronous reverse direction along the auxiliary screw rod 6 with the main gear 5. The synchronous linkage shifting block 33 moves along with the auxiliary gear 7. When the curtain bottom rail moves up to support the curtain top rail, so that the lifting rope of the lifting winder of the curtain top rail loses the gravity of the curtain top rail, the synchronous linkage shifting block 33 contacts the synchronous linkage boss 32 and shifts the synchronous linkage boss 32, so as to drive the auxiliary screw rod 6 to follow the auxiliary gear 7 in synchronous rotation. The auxiliary screw rod 6 drives the auxiliary mandrel 18, so that the auxiliary mandrel 18 synchronously moves along with the main mandrel 16, so that the curtain bottom rail and the curtain top rail synchronously move upwards, thereby avoiding supporting the curtain top rail such that the lifting rope on the lifting winder of the curtain top rail is loosened and a disordered line arrangement occurs.

The fixed and immovable limiting seat 1 enables the auxiliary screw rod 6 threadedly connected thereto to slide along the auxiliary mandrel 18, and the up-running stop boss 31 moves along with the auxiliary screw rod 6. When the curtain top rail goes up to a topmost position, the up-running stop block 3 stops the up-running stop boss 31 so as to prevent the auxiliary mandrel 18 and the main mandrel 16 from continuing to rotate.

As shown in FIG. 2, a guide positioning plate 34 is provided at the bottom of two sides of the upper box body 9 and located between two hooks 11, a guide positioning groove 35 is provided at the top of two sides of the lower box body 10 and located between two grooves 12, and the guide positioning plate 34 is located in the guide positioning groove 35 so as to align the hook 11 with the groove 12.

An agravity clutch 40 is further included, wherein the agravity clutch 40 is used for connecting the auxiliary mandrel 18 and the auxiliary head (not shown in the figure), and when the curtain bottom rail moves up to support the curtain top rail so that the lifting rope of the lifting winder of the curtain top rail loses the gravity of the curtain top rail, the agravity clutch 40 disengages the auxiliary mandrel 18 and the auxiliary head. At this moment, the power of the auxiliary mandrel 18 comes from the main mandrel 16, that is to say, the final power comes from the main head. After disengagement, the auxiliary mandrel 18 is no longer limited by the auxiliary head. When the lifting rope of the of lifting winder of the curtain head rail is again subjected to the weight of the curtain top rail, the agravity clutch 40 is reset, again connecting the auxiliary mandrel 18 and the auxiliary head together.

The auxiliary mandrel 18 and the main mandrel 16 rotate synchronously, and the auxiliary mandrel 18 drives the lifting winder of the curtain top rail to start synchronously winding the lifting rope, so as to synchronously move the curtain bottom rail and the curtain top rail upwards, and prevent the lifting rope from being disordered.

A debugging observation window 41 is provided on a surface of the upper box body 9, so as to observe the position of the stopper when debugging and facilitate debugging.

Working principle: the stopper of the present disclosure is mounted on the auxiliary mandrel and the main mandrel simultaneously, that is to say, is mounted on the double rails simultaneously, achieving the dual-rail dual-control correlation type limiting control, and performing real-time linkage control on the auxiliary mandrel while controlling the main mandrel. When the lifting rope of the lifting winder of the curtain top rail loses the gravity of the curtain top rail, synchronous linkage of the double rails is achieved through the stopper, thereby completely solving the problems of the lifting rope of lifting winder of the top rail being slack and the rope arrangement being disordered. In addition, the biggest benefit of the stopper is to simplify the debugging difficulty of the day-and-night curtains, and the lifting rope acting on the bottom rail and the top rail does not need to pass through the upper rail (installation box), thus greatly improving the debugging efficiency.

The auxiliary mandrel is used to adjust the size of the shading area above the upper end of the main body of the curtain, and the main mandrel is used to adjust the shading at any height below or at the hovering position, so that the lower part of the curtain can be completely closed or partially open, and the size of the open area can also be adjusted.

Furthermore, integrations and combinations of the various embodiments or examples and features of the various embodiments or examples described in this specification can be made by those skilled in the art without mutual conflict. While embodiments of the present disclosure have been shown and described, it will be understood that the above-described embodiments are illustrative and cannot be understood as being restrictive, and changes, modifications, substitutions and alterations may be made by those skilled in the art without departing from the scope of the present disclosure.

What is claimed is:

1. A day-and-night curtain dual-rail dual-control correlation type stopper, comprising a limiting seat, a down-running stop block, an up-running stop block, a main screw rod, a main gear, an auxiliary screw rod and an auxiliary gear, a side wall of the limiting seat being provided with a main threaded through-hole and an auxiliary threaded through-hole, one end of the main screw rod being inserted in the main threaded through-hole and being in threaded connection with the main threaded through-hole, the main gear being fixedly mounted on the main screw rod, the main screw rod being innerly provided with a main through-hole, the main through-hole being inserted on a main mandrel for driving a lifting winder of a curtain bottom rail and the main screw rod being able to slide along the main mandrel, the main gear meshing with the auxiliary gear, the auxiliary gear being provided with a threaded through-hole, the auxiliary gear being inserted on the auxiliary screw rod via a threaded through-hole and being in a threaded connection with the auxiliary screw rod, one end of the auxiliary screw rod being inserted in the auxiliary threaded through-hole and being in a threaded connection with the auxiliary threaded through-hole, the auxiliary screw rod being innerly provided with an auxiliary through-hole, the auxiliary through-hole being inserted on an auxiliary mandrel for driving a lifting winder of a curtain top rail and the auxiliary screw rod being able to slide along the auxiliary mandrel, a down-running stop boss being provided on the main screw rod, when the main mandrel drives the curtain bottom rail to move downwards, the main screw rod being driven to rotate simultaneously, the limiting seat being fixed and enabling the main screw rod threadedly connected thereto to slide along the main mandrel, the main screw rod driving the main gear to rotate and move simultaneously, the main gear driving the auxiliary gear to rotate, the auxiliary gear moving synchronously with the main gear along the auxiliary screw rod, the down-running stop boss moving along with the main screw rod, and when the curtain bottom rail moves downwards to a lowest position, the down-running stop block blocking the down-running stop boss so as to prevent the main screw rod and the main mandrel from continuing to rotate, a second end of the auxiliary screw rod being provided with an up-running stop boss and a synchronous linkage boss, an end face of the auxiliary gear being provided with a synchronous linkage shifting block, when the main mandrel drives the curtain bottom rail to move upwards, the main screw rod being driven to rotate in a reverse direction simultaneously, the limiting seat enabling the main screw rod threadedly connected thereto to slide in a reverse direction along the main mandrel, the main screw rod driving the main gear to rotate in a reverse direction and move in a reverse direction simultaneously, the main gear driving the auxiliary gear to rotate in a reverse direction, the auxiliary gear moving with the main gear in a reverse direction synchronously along the auxiliary screw rod, when a lifting rope of the lifting winder of the curtain top rail loses a weight of the curtain top rail, the synchronous linkage shifting block contacting the synchronous linkage boss and shifting the synchronous linkage boss so as to drive the auxiliary screw rod to follow the auxiliary gear in synchronous rotation, the auxiliary screw rod driving the auxiliary mandrel so that the auxiliary mandrel follows the main mandrel in synchronous rotation, the limiting seat enabling the auxiliary screw rod threadedly connected thereto to slide along the auxiliary mandrel, the up-running stop boss moving along with the auxiliary screw rod, and when the curtain top rail running up to a topmost position, the up-running stop block blocking the up-running stop boss so as to prevent the auxiliary mandrel and the main mandrel from continuing to rotate.

2. The day-and-night curtain dual-rail dual-control correlation type stopper according to claim 1, wherein the down-running stop block is provided on a side wall of the limiting seat.

3. The day-and-night curtain dual-rail dual-control correlation type stopper according to claim 1, further comprising an encapsulation box, an insertion hole being provided on one end face of the encapsulation box, a main mandrel passing-through port and an auxiliary mandrel passing-through port being provided on a second end face of the encapsulation box, a insertion connector being provided on the limiting seat, the limiting seat being provided in the encapsulation box and enabling the insertion connector to be inserted at the insertion hole, and the main gear, the auxiliary gear and the up-running stop block being provided in the encapsulation box.

4. The day-and-night curtain dual-rail dual-control correlation type stopper according to claim 3, wherein the encapsulation box comprises an upper box body and a lower box body, the upper box body is provided with two hooks at a bottom of two sides of the upper box body, with each side of the two sides of the upper box body having one hook, a groove is provided at a top of two sides of the lower box body, the two hooks are snap-fitted in the corresponding groove such that the upper box body and the lower box body are snap-fitted together, and the up-running stop block is provided on a bottom surface of the lower box body and close to one end, where the main mandrel passing-through port and the auxiliary mandrel passing-through port are provided, of the encapsulation box.

5. The day-and-night curtain dual-rail dual-control correlation type stopper according to claim 4, wherein a main rotary sliding sleeve is provided at the main mandrel passing-through port, and the main mandrel passes through a non-circular through-hole of the main rotary sliding sleeve; the auxiliary mandrel passing-through port is provided with an auxiliary rotary sliding sleeve, and the auxiliary mandrel passes through a non-circular through-hole of the auxiliary rotary sliding sleeve.

6. The day-and-night curtain dual-rail dual-control correlation type stopper according to claim 5, wherein a guide positioning plate is provided at the bottom of the two sides of the upper box body and located between the two hooks, a guide positioning groove is provided at the top of the two sides of the lower box body and located between two grooves, and the guide positioning plate is located in the guide positioning groove so as to align the two hooks with the grooves.

7. The day-and-night curtain dual-rail dual-control correlation type stopper according to claim 6, wherein a bottom surface of the limiting seat is provided with two insertion blocks and plug-in holes, the plug-in holes are located between the two insertion blocks, the bottom surface of the lower box body is provided with two plug-in grooves and insertion posts, the two insertion blocks are plugged in the plug-in grooves, and the insertion posts are plugged in the plug-in holes, so as to fix the limiting seat on the bottom surface of the limiting seat.

8. The day-and-night curtain dual-rail dual-control correlation type stopper according to claim 1, wherein a second end of the main screw rod is a D-shaped shaft, a protrusion is provided on the D-shaped shaft near an external thread of the main screw rod, the down-running stop boss is provided on a side wall of the protrusion, a fixing sleeve is provided on one end of the main gear, the main gear is integrally formed with the fixing sleeve, a through-hole of the fixing sleeve is a D-shaped hole adapted to the D-shaped shaft, and the fixing sleeve is inserted on the D-shaped shaft.

9. The day-and-night curtain dual-rail dual-control correlation type stopper according to claim 8, wherein the fixing sleeve is provided with a fixing hole, and a screw passes through the fixing hole and is in threaded connection with the D-shaped shaft to fix the main gear.

10. The day-and-night curtain dual-rail dual-control correlation type stopper according to claim 4, wherein a debugging observation window is provided on a surface of the upper box body.

* * * * *